United States Patent
Brademann et al.

(10) Patent No.: US 6,504,914 B1
(45) Date of Patent: Jan. 7, 2003

(54) METHOD FOR DIALOG CONTROL OF VOICE-OPERATED INFORMATION AND CALL INFORMATION SERVICES INCORPORATING COMPUTER-SUPPORTED TELEPHONY

(75) Inventors: Lutz Brademann, Berlin (DE); Christel Mueller, Schulzendorf (DE); Thomas Mundin, Neuenhagen (DE); Thomas Ziem, Zepernick (DE); Romeo Peter Wetzel, Stuttgart (DE); Hardy Parus, Berlin (DE)

(73) Assignee: Deutsche Telekom AG, Bonn (DE)

(*) Notice: Subject to any disclaimer, the term of this patent is extended or adjusted under 35 U.S.C. 154(b) by 0 days.

(21) Appl. No.: 09/446,161

(22) PCT Filed: Jun. 16, 1998

(86) PCT No.: PCT/EP98/03606

§ 371 (c)(1),
(2), (4) Date: Dec. 16, 1999

(87) PCT Pub. No.: WO98/58487

PCT Pub. Date: Dec. 23, 1998

(30) Foreign Application Priority Data

Jun. 16, 1997 (DE) .......................................... 197 25 421

(51) Int. Cl.$^7$ .......................... H04M 1/64; H04M 3/42; H04M 3/00
(52) U.S. Cl. ...................... 379/88.16; 379/67.1; 379/76; 379/88.01; 379/88.04; 379/88.17; 379/88.18; 379/201.01; 379/265.09; 379/266.07
(58) Field of Search .......................... 379/67.1, 76, 80, 379/88.01, 88.04, 88.13, 88.16, 88.17, 88.18, 201.01, 218.01, 265.01, 265.09, 266.01, 266.07

(56) References Cited

U.S. PATENT DOCUMENTS

| | | | | |
|---|---|---|---|---|
| 5,181,237 A | * | 1/1993 | Dowden et al. | ............... 379/88 |
| 5,530,852 A | * | 6/1996 | Meske, Jr. et al. | .......... 395/600 |
| 5,652,789 A | * | 7/1997 | Miner et al. | |
| 5,915,010 A | * | 6/1999 | McCalmont | ................ 379/212 |
| 6,064,666 A | * | 5/2000 | Wilner et al. | ............... 370/352 |

OTHER PUBLICATIONS

Newton's Telecom Dictionary, 16$^{th}$ Updated Edition, p. 739.*
* Lawrence R. Rabiner., "Speech–Processing Applications: The Goals for 2001," AT&T Technology.
* Christel Müller et al., "Dialogue Design Principles—Key for Usability of Voice Processing.".

* cited by examiner

Primary Examiner—Allan Hoosain
(74) Attorney, Agent, or Firm—Kenyon & Kenyon

(57) ABSTRACT

A method provides customer with simple and flexible dialog control and faster access to the desired information. In response to a customer call, a control program for dialog control created with the aid of a graphical editor as a flow chart is started, once access authorization is checked. All of the computer-supported telephony (CTI) information input modules and information output modules provided within the framework of the dialog control service in question, which are subject to continuous monitoring, are simultaneously made available in parallel to the customer via a control module for controlling the resources. The customer can actively intervene in the dialog already during the welcome via the information input modules allocated to him. The dialog commences again at the place designated by the customer. The method is suitable for at least information, news and connection services which are based on very significant parallelism and which are configured for mass telephony.

2 Claims, 3 Drawing Sheets

METHOD FOR DIALOG CONTROL OF VOICE-OPERATED INFORMATION AND CALL INFORMATION SERVICES INCORPORATING COMPUTER-SUPPORTED TELEPHONY

SPECIFICATION

1. Field of Invention

A method according to the present invention relates to dialog control between a customer and voice-operated information, news and connection services which are provided as services by service providers and implemented using computer-supported telephony.

2. Background Information

Voice-processing systems, particularly in the telecommunications sector, are becoming increasingly popular. In the United States, many such automatic information, news and connection services are part of everyday life. As a result, a number of companies, whose products are based on voice-processing technology, have already established themselves in this market. In implementing such services, the software components, with their run-time system and dialog editor, are very important.

Methods and systems for controlling automatic telephone dialogs have existed for about twenty years now. In this context, various basic architectures are distinguished, such as:

Systems and methods which exclusively control the voice data stream, as is, e.g., in telephone exchanges; and Systems and methods which process the voice data stream themselves.

Systems and methods which process the voice data stream themselves are oriented to the dialog between user and machine. The more closely a method or system conceived in this manner approaches human dialog behavior and human interaction, the more effective it becomes. Of course, such methods or systems can also control telephone calls, i.e., dial, switch and so on. The method steps used here correspond to the procedure of a human user when calling.

These kinds of approaches have evolved in steps, from systems that are programmed on a completely individual basis to systems that are programmable in an application-oriented manner using scripting languages.

Currently existing systems are characterized by:

Text-based scripting languages that are close to the hardware;

Graphical description languages that were added on subsequently to the scripting languages;

Representation of the dialog as a strictly hierarchically structured execution sequence for general usage or as rule-based linguistic systems for use in research;

Implementation close to hardware for specific components in a closed system world;

Sequential development processes with poor test and correction possibilities; and Complexity of the created applications due to lack of structuring means in the application definition.

PCT International Application No. 96 05685 describes a scripting system or rather a scripting method which offers a graphical user interface which enables the user to create, process and execute telephone scripts for use by an agent in the provision of information to a customer. In the system, a graphical WINDOWS$_R$ user interface is used for defining the fields within a script and the interrelations of the fields. The individual fields contain action objects such as a dialog for use with a customer and possible responses to customer questions. The system allows the user to create dialogs that contain information gathered from a database. Thus, each script is formed substantially in real-time in a customer-specific manner and contains data that relate to the individual customer and the agent which is in dialog with the customer. Additional action objects such as customer responses lead to the script branching off in different directions that are determined by the user. The system can be implemented either with a main computer or a number of workstation computers of the agents or it can be implemented in a network in which the scripts are contained in a network server and the agent workstations are coupled to the network.

European Patent No. 0 664 635 describes an automatic ordering system in communications switching stations. A voice recognizer is connected to the connection to an order server provided within the switching system. The voice recognizer recognizes individual keywords from the voice utterances made by a user via a calling connection instrument and stimulates a dialog control located in the order server. The dialog control controls in response a call number memory, a call number corresponding to the recognized keyword being read out which is used to establish a connection to a position taking this order.

In each case, these systems exhibit serious defects with respect to individual parameters. Systems having a sophisticated dialog language are usually highly hardware-dependent or require very significant computing expenditure. See Proceedings of Eurospeech "93" 2(3), CT. 943–946 "Dialogue Design Principles".

Systems having an architecture designed for significant parallelism and mass telephony are difficult to modify in terms of their architecture and, moreover, are very rigid in their dialog behavior. See Rabiner, Applications of Voice Processing to. Telecommunications Proceedings of the IEEE, vol. 82, no. 2, February 1994.

SUMMARY OF THE INVENTION

An object of the present invention is to delineate a method for controlling the hardware component used for the dialog between user/machine that is suitable for operating voice-operated information, news and connection services incorporating computer-supported telephony (CTI). The method should be suitable, in particular, for information, news and connection services that are based on very significant parallelism and are oriented towards mass telephony, and the architecture underlying the method should be easily expandable and developed with flexible dialog control, so that rapid access by the customers to the desired information is possible.

The method according to the present invention is implemented using a control program created by a service developer with the aid of a graphical editor in the form of a flow chart, in which the user/machine dialog control provides an execution routine such that simultaneous parallel control of all information input modules and information output modules involved within the framework of the concrete service offering in the querying and in the information exchange with the customer, and the individual switching off and an orderly resetting of all modules no longer needed within the framework of the querying and the information exchange with the customer are possible.

The control program designed as a flow chart is based on the description of the desired dialogs for the information exchange between user and machine with the aid of actions and previously described subdialogs by defining sequences of actions, indicating parallel actions within a dialog and defining general event handlings, interpreting the described dialogs on a computer system with a control module for controlling the resources which provides an S.100 interface/ S.300 interface, the interpretation being performed in parallel as often as necessary independent of the number of telephone lines.

The control program/flow chart created according to the above principles is integrated into the console management of a service supplier/provider.

When a call from a customer is present at the service supplier, following successful identification of the customer with respect to the system of the service supplier via the control program/flow chart tailored to the respective application, all CTI information input modules and CTI information output modules that the customer needs for information and for communication with the system and particularly for input of the customer's wish for information are started so that they are simultaneously available to the customer.

As CTI modules, the following are understood in the sense of the present invention:

Modules for outputting information to the customer (information output modules) and Modules for inputting information or rather the customer's wishes into the system (information input modules).

CTI modules, include, for example:

Voice recognition modules/ASR modules

Voice output modules

Fax modules

Telephony modules

Voice verification modules.

As information output modules for outputting information to the customer, e.g., recorded announcements, players (for example) in which individually controllable recorded announcements are stored are suitable. Information input modules for inputting customer wishes can be, for example, keyboards or modules for voice recognition.

For determining the customer wishes in the user/machine dialog, for example, a module for active voice recognition (ASR module) is started and likewise made available to the customer in parallel to the other CTI modules. The flow chart is designed such that the customer can actively interrupt during the welcome a recorded announcement executing as an interrogation routine with customer information that is played by a voice output module formed as a player for outputting recorded announcements by expressing the customer's information wish via the input possibilities available to the customer, preferably voice. Via the voice recognition module following in parallel, this wish is received and compared with stored information. If a wish is recognized, e.g., using a keyword uttered by the customer, the recorded announcement is immediately interrupted, controlled via the control program/flow chart, and the information output module reset. The control program/flow chart is designed such that in the case in which one of the parallel connected CTI modules is triggered/addressed or actuated by the customer, all parallel connected CTI modules are reset and switched off. If the information input by the customer is already sufficient to determine the information desired by the customer, then the desired information is provided to the customer. This can take place, for example, in an announcement service via voice output to the customer.

If the information input hitherto by the customer is not yet sufficient to determine the information desired by the customer, the interrogation routine is reactivated via the control program/flow chart, again all CTI modules involved in the customer query, as previously described, are restarted in parallel and made available to the customer. The information output module, e.g., a player, is started in the place of the recorded announcement that is based on the information already received by the customer in the aim of making this more precise. In this place also, the customer can again interrupt the execution process of the interrogation routine by inputting further information, making the customer's information wish more precise. Then after inputting information of the customer recognized as valid via the voice recognition module (ASR module), all other parallel active CTI modules are again orderly reset and switched off.

The dialog is continued according to the above principles until the information desired by the customer can be determined. Reaction can occur globally or specifically in the dialog to abort conditions of the CTI modules or to premature aborting through customer input, this being enabled in the editor through a global dialbox.

In an embodiment according to the present invention, a method is explained in greater detail based on the description of a dialog between a customer and a computer-telephony-based enquiry and information service of a service supplier/service provider. The embodiment is intended to be merely illustrative and is not intended to limit the scope of the present invention.

DETAILED DESCRIPTION

Figure 1:
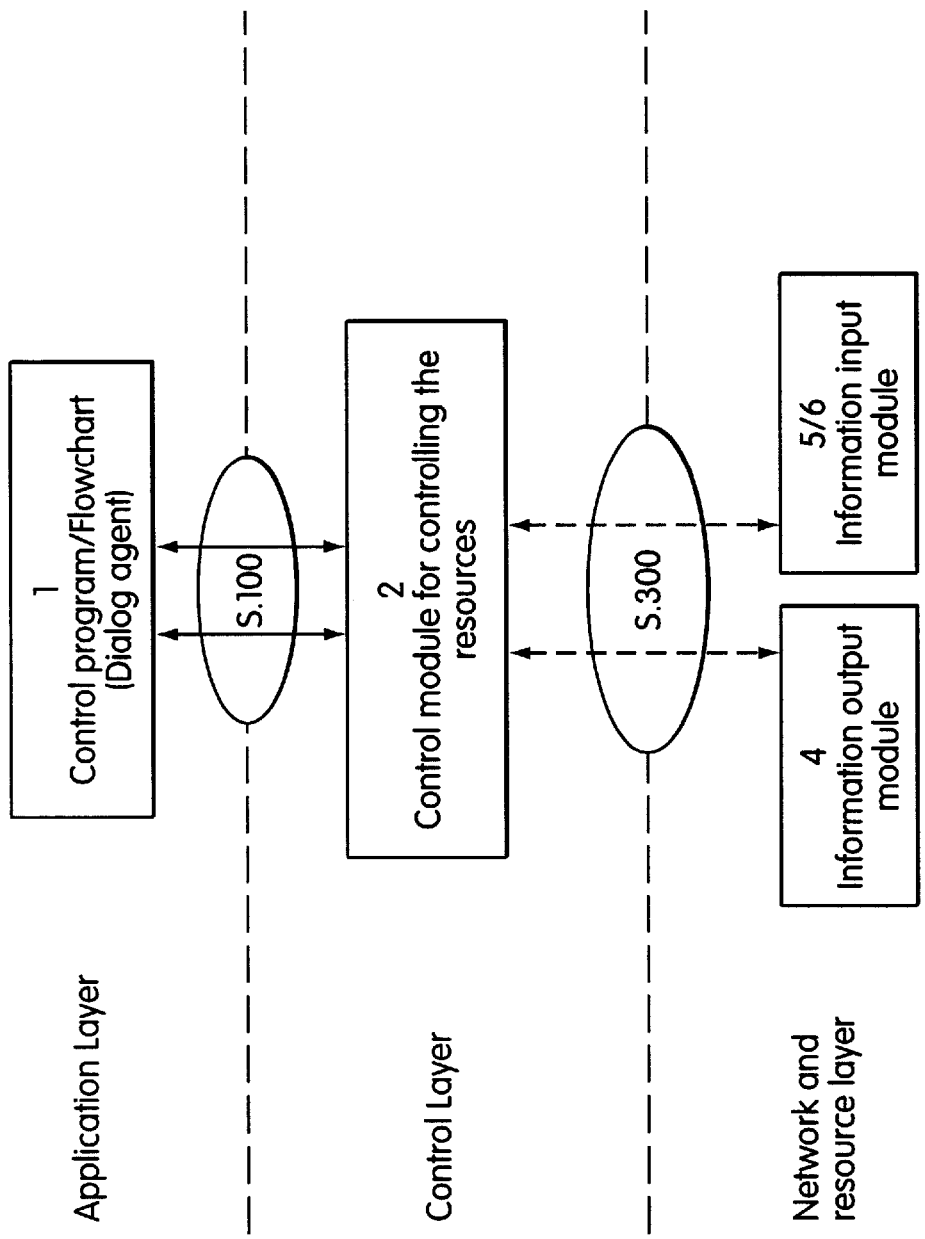
FIG. 1 shows basic structure of a dialog system according to the present invention.

In FIG. 1, a dialog system according to the present invention includes in an as a dialog agent and represents the current interpretation of a dialog. The application layer is connected via an S.100 interface to the control module assigned to the control layer for controlling the resources. The control layer is connected via an S.300 interface to the network and resource layer, including the CTI information output modules and the CTI information input modules.

Figure 2:
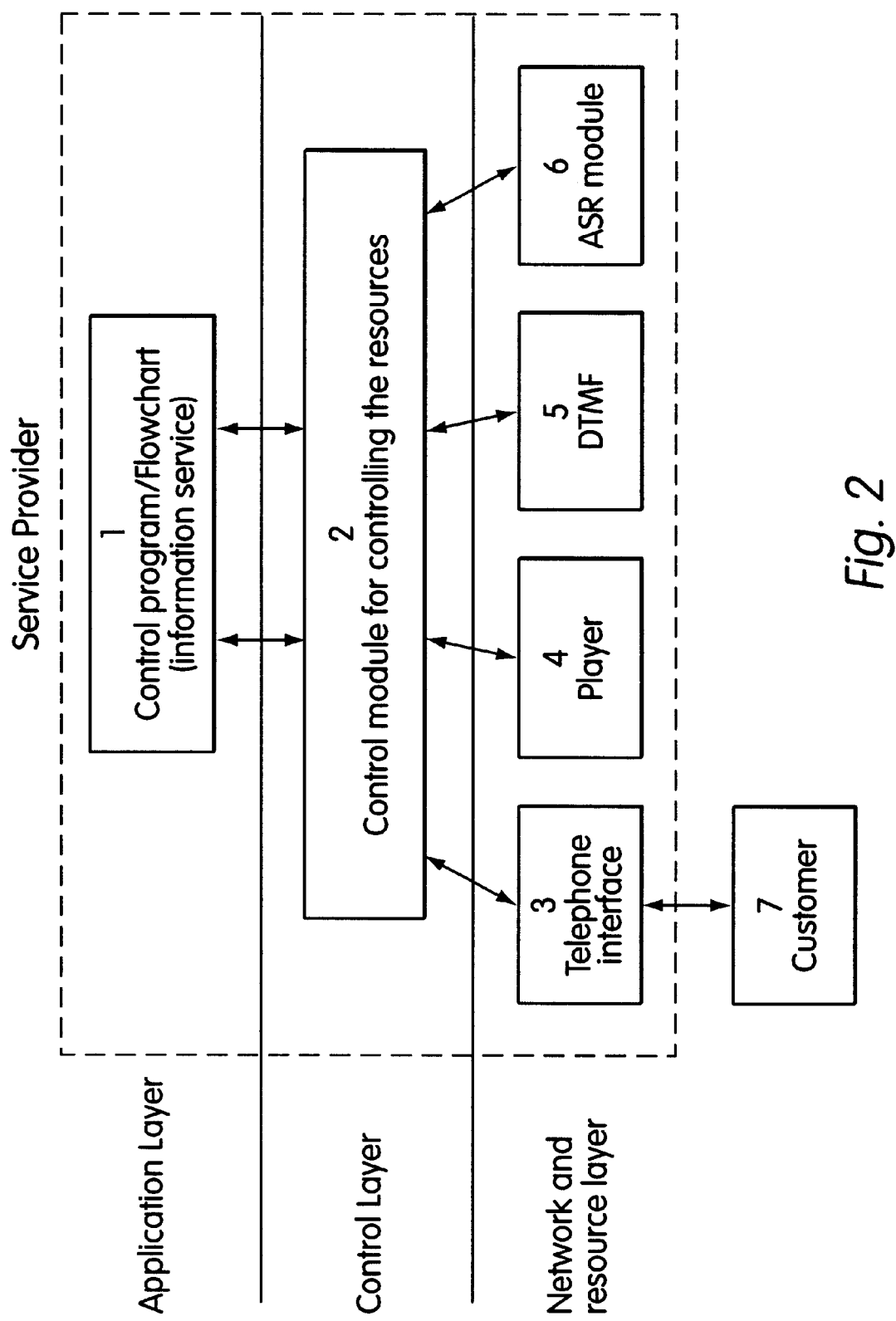
FIG. 2 shows structure for a dialog system of an information service according to the present invention.

FIG. 2 shows an embodiment for an information service of a service provider according to the present invention.

The control program/flow chart includes as an application the application program for an information service. The control module for controlling the resources is connected to the telephone interface modules, ASR module for voice recognition, DTMF modules (Dual Tone Multi-Frequency) and players, the players being designed as information output modules and the ASR modules and DTMF modules as information input modules. The connection to the customer is established via the telephone interface module.

Figure 3:
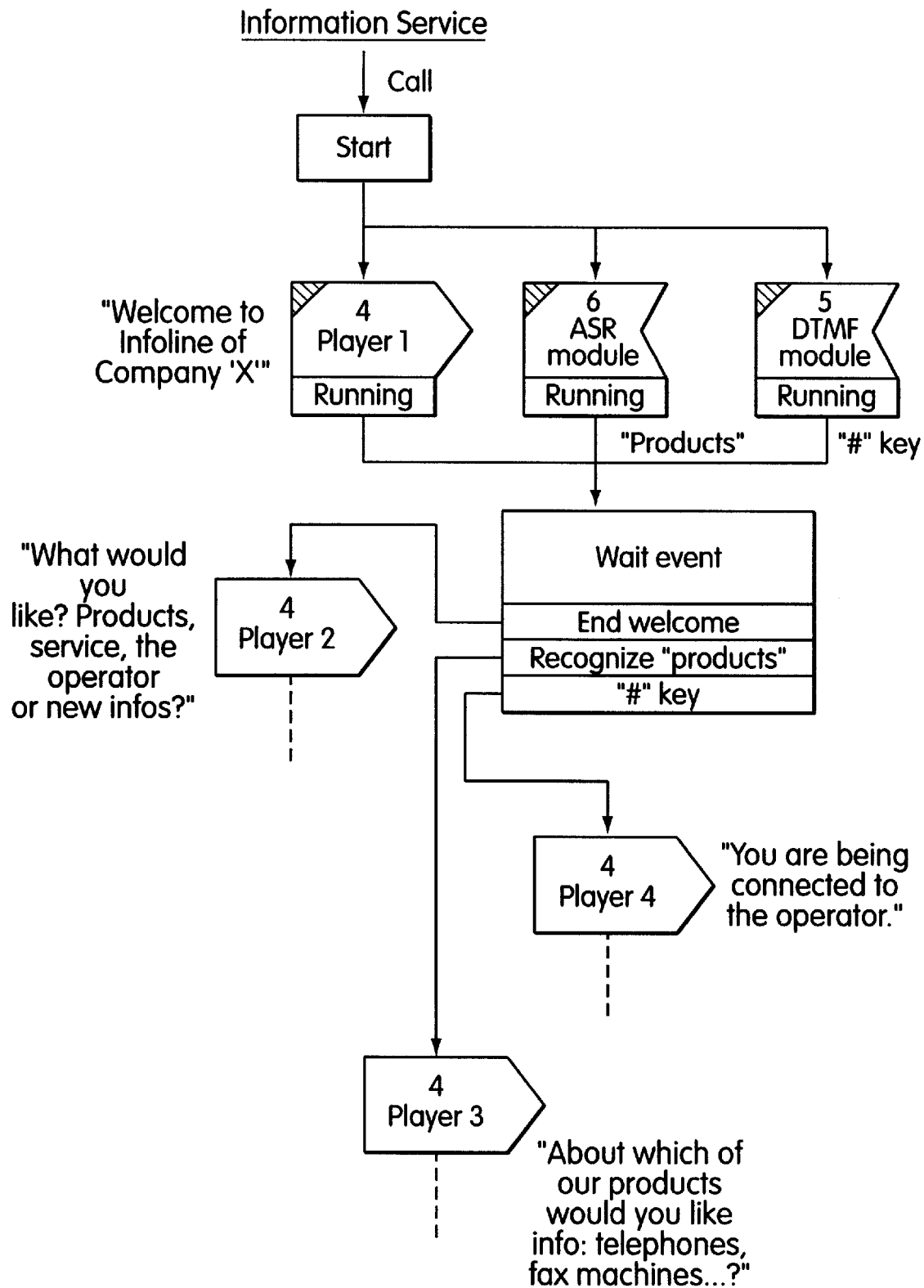
FIG. 3 shows a flow chart illustrating an example of a dialog between a customer and the dialog system of the information service according to the present invention.

Based on the flow chart according to FIG. 3, the dialog of a customer with the system is explained hereafter in greater detail.

If a customer calls the service number of the service supplier/provider, following establishment of the connection and successful identification of the customer with respect to the system of the service supplier, the information service is automatically started via the control program/flow chart of the application layer. Here, according to the present invention, the output module player 1 as well as the input modules ASR module and DTMF module provided within the framework of the information service are simultaneously started in parallel and connected via the telephone interface to the customer. The states of the information input modules and information output modules simultaneously available in parallel to the customer are subject to continuous monitoring. Via player 1, a welcome text, e.g., "Welcome to the infoline of company "X" . . . " is output to the customer.

The customer has the possibility, starting from the moment when the information input and information output modules are available to him, of actively intervening via the ASR module or the DTMF modules in the dialog control since the states of the information input and information output modules are continuously monitored.

Corresponding to the selected example, multiple possibilities arise for the customer for active shaping of the dialog within the framework of the information service selected by the customer.

A customer who takes advantage of the information service for the first time will normally listen to the welcome text output via player 1 to the end. In this case, after the end of the welcome text the ASR module and the DTMF module are halted and reset. A player 2 is started via which a further information text is output to the customer indicating the information contents, e.g., information about products, services or new infos, offered within the framework of the information service.

A customer who has already taken advantage of the information service a number of times can actively intervene in the dialog control during the execution of the welcome text since the customer generally is familiar with all the subjects offered within the framework of the information service. Thus, the customer can interrupt the welcome text with a voice input, e.g., the word "Products". The word entered by the customer via voice is compared via the ASR module with the words allowable for interrupting the welcome text and recognized as allowable. Via the control module for controlling the resources, player 1, the ASR module and the DTMF modules are reset and switched off. Player 3, which contains information about the product palette for company X, e.g., on telephones and fax machines, is started and connected through to the customer. Simultaneously with player 3, the ASR module and the DTMF modules are started again in parallel and switched through to the customer. The customer can choose the desired product from the product palette and input his wish via voice information. The desired information is output to the customer via player 3.

A further possibility for the customer to intervene in the dialog is provided by additionally offering the customer a function via which he can manually, e.g., by actuating a key on his telephone or his PC, intervene in the dialog. In the embodiment shown in FIG. 3, the customer can intervene in the dialog via voice input as well as manually by keystroke by pressing a telephone key. Manual input via telephone key or even via the keyboard of a computer is provided particularly for the case in which the customer has difficulties and wants a connection to an operator. If the customer, e.g., during the execution of the welcome text, presses the key on his telephone to which a corresponding function was assigned, this is recognized via the DTMF module. Prior to starting player 4 which contains the information about the connection to the operator, player 1 and the ASR module are halted and reset. The customer is automatically connected to the operator after output of the voice information of player 4.

The dialog system structured for control of the dialog according to the principles of
  a) description of the desired dialogs with the aid of actions and already described dialogs by defining sequences of actions, indicating parallel actions within a dialog, defining general event handlings, and
  b) parallel interpretation of the described dialogs, as often as useful, independent of the number of telephone lines, can be further increased in terms of its effectiveness.

A particular clarity and simple handling of the dialog execution are achieved particularly if the desired dialogs are described graphically.

The application range of the dialog can be increased by describing dialogs with subdialogs which can be incorporated via a subdialog action into other dialogs.

Another embodiment of the dialog control according to the present invention includes parallel interpretations (telephone agents) of the dialogs and can communicate amongst one another and exchange data. If dialogs are described with subdialogs which can be incorporated via a subdialog action into other dialogs, it is advantageous if each subdialog action is automatically compared with the associated subdialog with regard to the entry and exit events as well as the parameters.

Moreover, it is advantageous to provide a possibility to be able to test dialogs graphically and interactively and resolve errors.

Particularly for use by multiple different users, it is advantageous if the individual actions can be documented.

A further provided simplification in the application includes configuring the actions with the aid of parameters. It is also advantageous to process voice data directly within the graphical development environment.

With very extensive applications, there is the possibility to control the interpretation of the dialogs with the aid of a network management protocol via a computer network.

The interpretation of the dialogs for the implementation of the method according to the present invention takes place according to the following algorithm:

1. A global variable table is created.
2. The dialog is loaded, i.e., the file with the dialog description is read and based on the content a network of action objects is set up. The individual action objects contain the parameters defined by the user, a list of entry events, a list of exit events, a boolean variable whether this action is parallel and for this case a parallel exit. Moreover, the three work functions for entering into the action, waiting on events and exiting the action are stipulated by the type of action.
3. After activation of the dialog, for each desired dialog agent a parallel interpretation of the dialog is started which is described in the following steps. Each agent acts substantially independent of the parallel active agents. The overall system can at any time be extended by further agents or terminated after termination of all agents. The termination of an agent can also be compelled from outside by setting a termination flag for this agent (smart shutdown). If the overall system is to be terminated, all agents are first terminated.
4. For this dialog agent, i.e., the current interpretation of this dialog, a connection to the S.100/S.300 server is established and depending on the CTI module requirements, a wait is made for the transfer of a CTI module, e.g., through a telephone call.

5. The start of the first subdialog is searched for, the list of current dialog states is emptied and then filled with a dialog state set up for this start.
6. The points 7.–9. are processed in a loop until all dialog states are located in a terminal state. Then, all dialog states are cleared and the interpretation re-commenced with point 5, in case at least once a wait situation was passed through in steps 7–xx. Otherwise, the interpretation is terminated within the framework of this dialog agent.
7. Each dialog state is checked in sequence:
   i. If it is in the "Exiting" state, then a termination flag is set which initiates the termination of the entire dialog interpretation (smart shutdown).
   ii. If it is in the "Progressing" state, then the exit function of the associated action is first executed. Then, the exit conditions are checked and the suitable exit event selected. The computation determines the subsequent action and its entry event and modifies the data in the dialog state accordingly. In the now current action, the entry function is executed and then for this dialog state the current step 7 repeated
      Peculiarities:
      a) For SUBDIAL/START actions, a new variable space is created for local variables and there a reference is entered to the superordinate variable space and the calling SUBDIAL action.
      b) For RETURN actions, all dialog states are checked whether they or their calling predecessors use the same local variable space. In this case, one is dealing with parallel operations that are terminated with this return action. For this purpose, in these dialog states the state is set to "Aborting" and the respective abort functions of the associated actions are called. Then, the parameters are transferred into the local variables of the calling dialog, the local variable structure released and upon exit the calling SUBDIAL action continued.
      c) For STOP actions, the state is set to "Exiting".
   i. If the dialog state is in the "Wait Event" state, all exit conditions of this state are checked. If one of them is true, for the current dialog state the subsequent state is determined as described under i.
   ii. If the dialog state is in the "Waiting" state and the termination flag is set, then the "Aborting" state is set and the abort function of the associated action is called.
   iii. Otherwise, the dialog state remains untouched.
8. If the termination flag is set and all states are in a terminal state, then the interpreter is terminated. For this purpose, the data structures of the variables are no removed and any open connections to the S.100/S.300 system or to databases, etc. are terminated and then the data structures of this agent entry are cleared.
9. If one of the dialog states is in the "Waiting" state, then it is now waited for an external event (from S.100/S.300, timer, other agent, other process) of a CTI module and as soon as this occurs all dialog states are checked in sequence until an event handling function of an associated action confirms the processing of the event message by returning a positive truth value.
10. If the process of interpretation is to be externally controlled, then a global termination flag can be set which under step 7 causes the termination of all active dialog states by setting the termination flag and executing the abort function. The interpreter runs until all dialog states are in a terminal state, i.e., the state "Terminated", or have cleared themselves.

The working principle underlying the flow chart of the dialog system is characterized by a graphical, user-friendly architecture with an integrated run-time environment for massively parallel computer-supported telephony. Some conceptional parts of the flow chart include the construction according to a class hierarchy which contains, on the one hand, dialog processes and, on the other hand, graphical and descriptive elements, the structuring of the dialog descriptions in pages, the support for libraries, the integration of the voice data processing and the system architecture based on the S.100/S.300 standard with the input and output modules for integration of the components editor, debugger and runtime as well as further auxiliary components.

What is claimed is:

1. A method for controlling a dialog of at least one of voice-operated information, news and connection services incorporating computer-supported telephony, comprising the steps of:

checking access authorization in response to a call;

after checking access authorization, starting a control program for dialog control, the dialog control program being created, via a graphical editor, as a flow chart;

If controlling the dialog via a server-controlled operation using a speaker-independent voice recognition module, the voice recognition module responding to key words;

interpreting the dialog of the control program by (1) describing a desired dialog with aid of at least one of an action and a previously described subdialog by at least one of defining sequences of actions, indicating parallel actions within the dialog and defining general event handlings, and (2) interpreting in parallel on a computer system at least one of the described dialog and dialog steps, the interpreting in parallel being repeated as often as useful and being independent of number of telephone lines, the computer system including a control module having an S.100 interface and an S.300 interface;

activating a control module via the control program;

making simultaneously available in parallel, via the activated control module, computer-supported telephony (CTI) information input modules and CTI information output modules applicable for a particular query routine, the input modules and the output modules being subject to continuous state monitoring;

logically linking a recorded announcement to the flow chart via the output modules, the recorded announcement including a query routine and operating information, the recorded announcement being automatically started and outputted;

inputting information via at least one of the input modules made simultaneously available in parallel, the inputting occurring at least one of during and after outputting of the operating information via output modules;

comparing the inputted information with information contents permitted in the particular query routine;

halting and resetting the input modules and the output modules made simultaneously available in parallel if the inputted information compared is acceptable to the control module;

if the inputted information is insufficient to output desired information, then:

again making simultaneously available in parallel, via the activated control module and the control program, input modules and output modules applicable for the particular query routine, outputting the recorded announcement via the output modules, the recorded announcement taking into account previously inputted information, at least one of actively interrupting the outputting of the recorded announcement by inputting additional information to further determine the desired information and waiting until the after completion of the outputting of the recorded announcement before inputting additional information to further determine desired information, and halting and resetting the input modules and the output modules again made simultaneously available in parallel if the additional inputted information includes information acceptable to the control module; and terminating the dialog if at least one of inputted information is sufficient to output the desired information and an abort command is triggered via the input modules.

2. The method according to claim 1, further comprising the step of:

establishing a connection to an operator of a service provider via the control module, the control module at least one of being triggered by and recognizing at least one of a particular inputted key word and an actuated key on a terminal.

* * * * *